(12) United States Patent
Sodani et al.

(10) Patent No.: US 7,721,076 B2
(45) Date of Patent: May 18, 2010

(54) TRACKING AN OLDEST PROCESSOR EVENT USING INFORMATION STORED IN A REGISTER AND QUEUE ENTRY

(75) Inventors: Avinash Sodani, Portland, OR (US); Vijaykumar B. Kadgi, Portland, OR (US); Zeev Sperber, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 371 days.

(21) Appl. No.: 11/641,424

(22) Filed: Dec. 18, 2006

(65) Prior Publication Data

US 2008/0148282 A1    Jun. 19, 2008

(51) Int. Cl.
 *G06F 9/00* (2006.01)
(52) U.S. Cl. .................. 712/244; 712/218
(58) Field of Classification Search .......... 712/218, 712/244
 See application file for complete search history.

(56) References Cited

U.S. PATENT DOCUMENTS 5,564,111 A * 10/1996 Glew et al. ............ 714/53
5,627,981 A *  5/1997 Adler et al. ........... 712/235
5,692,169 A * 11/1997 Kathail et al. ......... 712/244

2005/0138333 A1    6/2005  Samra et al. ............ 712/218

FOREIGN PATENT DOCUMENTS

JP    2001092659 A  *  4/2001

OTHER PUBLICATIONS

Deborah T. Marr, et al., "Hyper-Threading Technology Architecture and Microarchitecture," Intel Technology Journal Q1, 2002, pp. 1-12.
Jon Stokes, "Into the Core: Intel's Next-Generation Microarchitecture," Apr. 5, 2006, pp. 1-3.
Apple Developer Connection, "Hardware Overview," Sep. 9, 2005, pp. 1-3.

* cited by examiner

*Primary Examiner*—David J Huisman
(74) *Attorney, Agent, or Firm*—Trop, Pruner & Hu, P.C.

(57) ABSTRACT

Method, apparatus and system embodiments provide a register to track the oldest exception event or sticky event in a processor. The processor may be an out-of-order processor. Dispatched instructions (or micro-ops) may be maintained in a queue, such as a reorder buffer (ROB), for in-order retirement. For at least one embodiment, event information is maintained only in the register and is not maintained in a ROB. For at least one other embodiment, event information is maintained in a ROB entry for some events and in the register for others. For such latter embodiment, a retire engine takes the contents of both the ROB entry and the register into account when determining whether to take an exception or otherwise initiate a handling sequence during in-order instruction retirement. Other embodiments are also described and claimed.

25 Claims, 8 Drawing Sheets

TRACKING AN OLDEST PROCESSOR EVENT USING INFORMATION STORED IN A REGISTER AND QUEUE ENTRY

BACKGROUND

1. Technical Field

The present disclosure relates generally to information processing systems and, more specifically, to a mechanism to track the oldest exception event for in-flight instructions in a processor.

2. Background Art

In response to market demand for increased processor performance, various techniques have been employed. One such technique is out-of-order instruction execution. Out-of-order execution is a microarchitectural enhancement that allows a processor to pull instructions into the pipeline, out of program order, in order to keep the pipeline as full as possible. The processor thus re-orders instructions and executes them as quickly as their inputs are ready, without regard to original program order. Architectural state for the instructions is committed in program order. Likewise, fault, trap or other exception events or architectural events that occur during out-of-order execution of instructions are taken in program order.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of an apparatus, system and methods for tracking information for the oldest (vis-à-vis program order) exception event for unretired instructions or micro-operations in a processor.

DETAILED DESCRIPTION

In the following description, numerous specific details such as processor types, pipeline stages, particular examples of sticky events and exceptions, and microarchitectural structures have been set forth to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

As used herein, the term "exception event" is intended to include any synchronous instruction-processing event that forces a control flow branch. Exceptions may include faults (restarted at the address of the fault), traps (restarted at the address following the address that caused the trap) or aborts (no reliable restart address) that are "synchronous" in the sense that execution of a particular instruction in an instruction pipeline triggers the event. An exception event is thus "synchronous" in the sense that the event is associated with execution of a particular instruction. In contrast, as used herein the term "exception" is not necessarily intended to include asynchronous processor events, such as interrupts.

As used herein, term "sticky event" is intended to include any synchronous architectural instruction-processing event that causes the setting of an architectural status flag that is not cleared during retirement of the instruction. Examples of sticky events may include, for example, the execution of an instruction that generates a sticky numerical exception condition. A specific example of this type of sticky event may be a numerical exception that has been detected during execution of an SSE (Intel® Streaming SIMD Extensions) instruction. For such events, the "sticky" status indicator in a register (e.g., MXCSR control/status register) that is set upon execution of the instruction is not cleared at retirement, but remains set until later cleared. It may be later cleared, for example, by a load instruction that loads a zero into the sticky status indicator field.

Another example of a type of sticky event may be, for example, the execution of an architectural instruction that enables data breakpoint processing. Again, the data breakpoint processing remains enabled in a sticky fashion, after execution of the enabling instruction, until a later architectural instruction is executed to disable breakpoint processing.

As used herein, the term "event information" is intended to encompass information about exception events, as described above, as well as information about sticky architectural events, as described above.

Many known processing systems include a hardware queue structure, known as a reorder buffer ("ROB"), to support out-of-order instruction execution. The reorder buffer maintains an entry for each instruction in the instruction execution pipeline that has not yet been retired. The reorder buffer thus supports out-of-order execution by buffering instructions whose results are to be committed in program order.

For purposes of further discussion of the ROB, it should be understood that the ROB queue structure, in particular, and out-of-order processing, in general, may be found in both RISC (reduced instruction set computing) and CISC (complex instruction set computing) architectures. For RISC architectures, the RISC instructions that are in flight are maintained in the ROB.

For CISC architectures, each CISC instruction may be decoded into multiple constituent micro-operations (micro-ops). It is the micro-ops that are executed and are tracked in the ROB while in flight. For simplicity of discussion, as used herein the term "instruction" is intended to encompass RISC-type instructions (including each of the multiple RISC-type instructions in a single very long instruction word (VLIW) program instruction) and is also intended to encompass CISC micro-operations. Sometimes this inclusive use is made explicit in the text, and sometimes it not. In either case, such inclusive use of the word "instruction" is intended throughout the following discussion.

In addition to these in-flight instructions, the reorder buffer may also hold the exception status of each instruction (or instruction micro-operation as the case may be) that is in flight. (As used herein, an "in flight" instruction is an instruction that has been executed but not retired). In this manner, the reorder buffer may also allow for precise exception handling. During execution, if an instruction or micro-operation ("micro-op") encounters fault, trap or other exception event, then a status field is set in the appropriate entry of the ROB to record the event. This exception status is carried with the entry for the in-flight instruction (or micro-op) in the ROB until the instruction is either committed or flushed. During execution of an instruction that causes a sticky architectural event, the status field is carried with the ROB entry of the instruction and is written to the appropriate sticky status indicator (e.g., flag in a status register) during retirement of the instruction, assuming that the instruction is the oldest instruction associated with the sticky event.

Flushing of the ROB entries may occur when an exception event is encountered during retirement processing for an in-flight instruction that is older, in program order, than other instructions. The younger instructions are flushed from the pipeline when an exception for an older instruction is taken.

Accordingly, when an instruction becomes the oldest instruction in the machine and before the instruction is retired, its event status in its reorder buffer entry is checked. Any pending events are serviced before the instruction is retired. Oftentimes, servicing of the event requires that the pipeline be flushed of younger instructions and that execution of an appropriate event handler be initiated. However, flushing of the pipeline is not always the case. For example, instructions whose execution cause a sticky event are detected, and retired, but the sticky bit stays set in the machine after the instruction is retired.

The inventors have observed that, even though typical ROB structures may track the event status for every in-flight instruction in the pipeline, the event status that truly matters for correct execution is the event status for the oldest unretired instruction. That is, the event for the oldest instruction is the one that will be serviced, while the entries (including event status) for the younger instructions may be flushed from the pipeline if an exception is taken on an older instruction. As used herein, a "younger" instruction is one that is issued relatively later, according to program order, than an "older" instruction.

Figure 1:
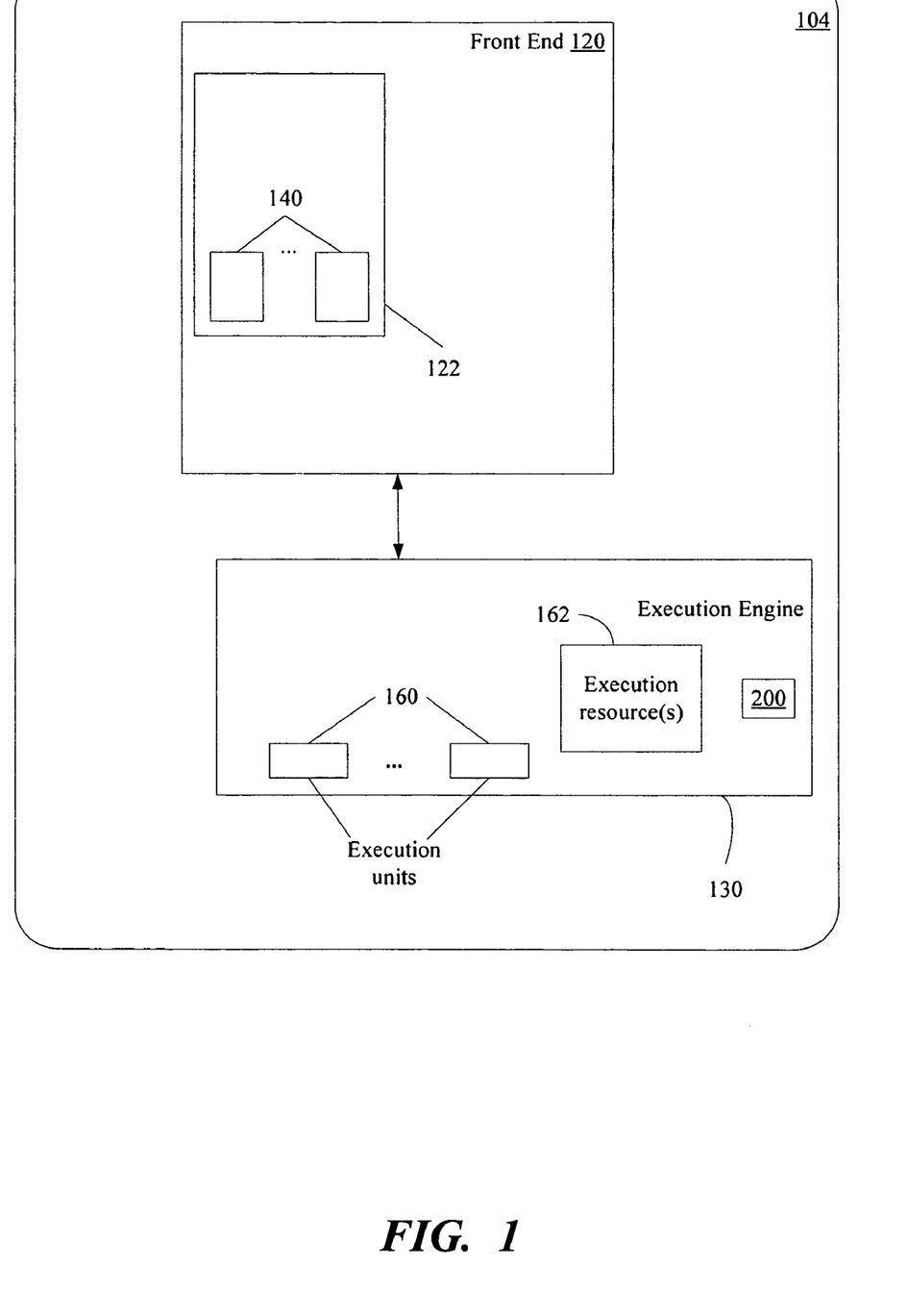
FIG. 1 is a block diagram illustrating at least one embodiment of a processor having an event tracker register to track the oldest event information in a processor.

FIG. 1 is a block diagram illustrating a processor 104 capable of performing disclosed techniques to track the oldest pending exception event in a processor. Thus, the processor 104 illustrated in FIG. 1 may avoid the overhead expense of unnecessarily tracking event status per instruction, when the event status of only one instruction (that is, the oldest instruction), is needed. In this manner, the processor 104 tracks only the event status for the oldest outstanding event in the processor 104. The processor may include an event tracker register 200 in which to track this event status for the oldest instruction. (An alternative embodiment, discussed below in connection with FIG. 7, may utilize both an event tracker register 200 as well as per-instruction event status maintained in a ROB (see, e.g., 264 of FIG. 4) to perform event tracking).

FIG. 1 illustrates that the processor 104 may include a front end 120 that prefetches instructions that are likely to be executed. The front end 470 may include a fetch/decode unit 122. The fetch/decode unit 122 includes at least one sequencer 140. For at least one embodiment, the fetch/decode unit 122 includes multiple logically independent sequencers 140, one for each of multiple logical processors. A "sequencer", as used herein, is next-instruction pointer and fetch logic, which is independently capable of sequencing through a set of instructions for a particular logical processor. The logical processors may also be interchangeably referred to herein as "physical threads." The single physical fetch/decode unit 122 thus includes one or more logically independent sequencers 140 (instruction pointer and fetch logic), each corresponding to a physical thread.

FIG. 1 illustrates that at least one embodiment of processor 104 includes an execution engine 130 that prepares instructions for execution, executes the instructions, and writes back the results of the executed instructions.

The execution engine 130 may include out-of-order logic (not shown) to schedule the instructions for out-of-order execution. The execution engine 130 may also include the event tracker register 200, as well as one or more resources 162 that the execution engine 130 utilizes to smooth and re-order the flow of instructions as they flow through the execution pipeline and are scheduled for execution. These resources may include one or more of an instruction queue to maintain not-yet-scheduled instructions, memory ordering buffer, load request buffers to maintain entries for uncompleted load instructions, store request buffers to maintain entries for uncompleted store instructions, and the like.

The processor 104 may also include retirement logic (not shown in FIG. 1, but see retire engine 250 of FIG. 2) that reorders the instructions, executed in an out-of-order manner, back to the original program order. The retirement logic may receive the completion status of the executed instructions from execution units 160 and may process the results so that the proper architectural state is committed (or retired) according to the program order.

Figure 2:
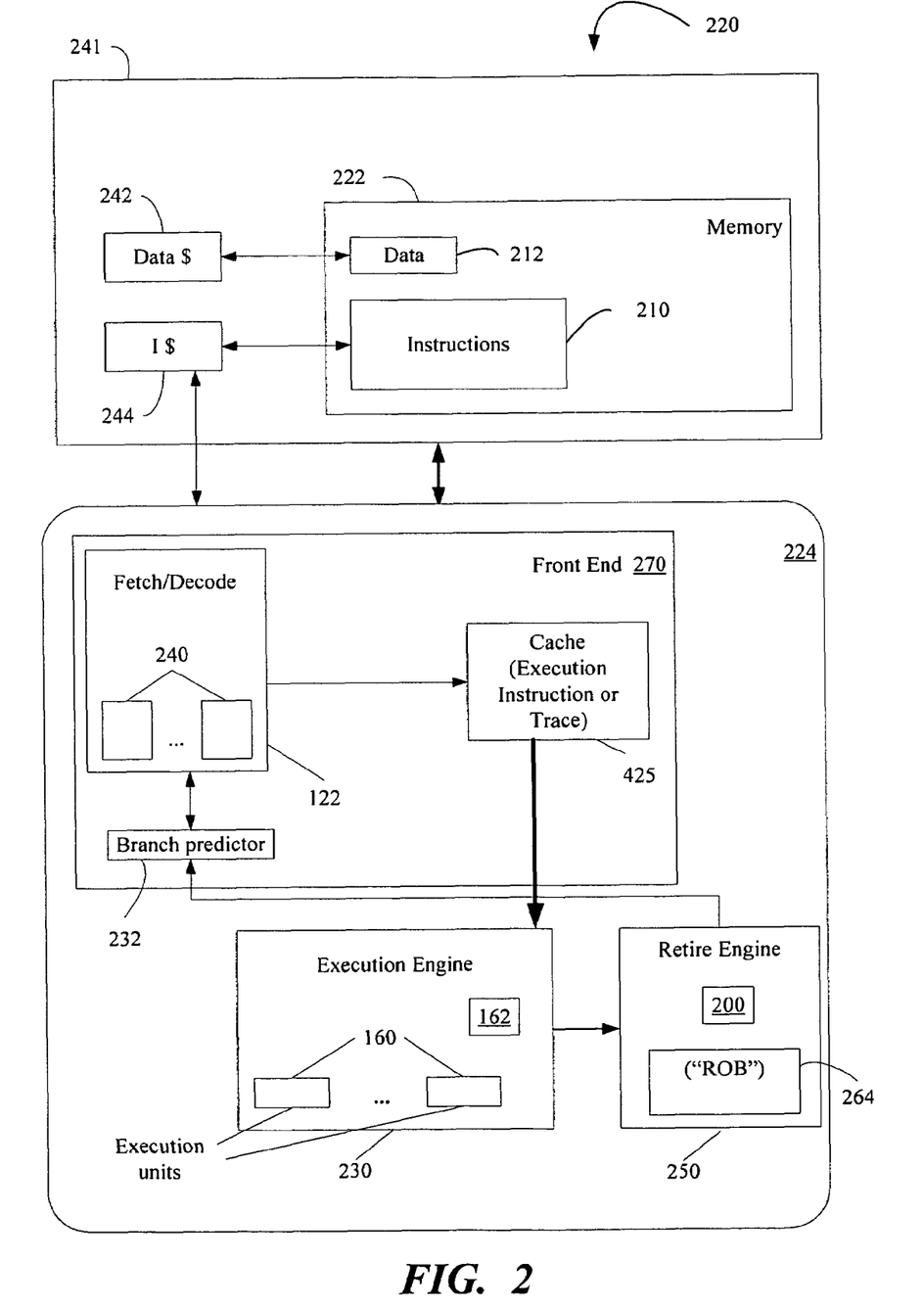
FIG. 2 is a block diagram illustrating at least one embodiment of a system capable of performing disclosed techniques.

FIG. 2 is a block diagram illustrating at least one embodiment of a computing system 220 capable of performing the disclosed techniques to track in a register the oldest pending exception event in the pipeline. The computing system 220 includes a processor 224 and a memory 222. Memory 222 may store instructions 210 and data 212 for controlling the operation of the processor 224.

The processor 224 may include a front end 270 along the lines of front end 120 described above in connection with FIG. 1. Front end 270 supplies instruction information to an execution engine 230. For at least one embodiment, the front end 270 may supply the instruction information to the execution engine 230 in program order.

The front end 270 may include a fetch/decode unit 122. The fetch/decode unit 122 may include hardware logic (not shown) of a hardware decode unit along with logic for one or more independent logical sequencers 240, each for a physical thread.

For at least one embodiment, the front end 270 prefetches instructions that are likely to be executed. A branch prediction unit 232 may supply branch prediction information in order to help the front end 270 determine which instructions are likely to be executed.

The execution engine 230 may include out-of-order logic to schedule the instructions for out-of-order execution. At least one embodiment the execution engine 230 prepares instructions for out-of-order execution, then schedules and executes the instructions. The execution core 230 may include execution resources 162 as discussed above in connection with FIG. 1.

The execution engine 230 places executed instructions in the ROB 264. The ROB 264 is hardware queue that maintains information for instructions in the execution pipeline until such instructions are retired in program order.

Although only one reorder buffer 264 is shown in FIG. 2, alternative embodiments the processor 224 may include more than one reorder buffer 264. That is, a single reorder buffer 264 may maintain unretired instruction information for a single-threaded embodiment of the processor 224. Similarly, a single reorder buffer 264 may maintain unretired instruction information for all logical processors of an SMT embodiment of the processor 224 (the ROB 264 may be partitioned among the logical processors). Alternatively, a separate reorder buffer 264 may be maintained for each logical processor of an SMT embodiment of the processor 224.

The execution engine 230 may include retirement logic 250 that reorders the instructions, executed in an out-of-order manner, back to the original program order in the retirement queue 264. This retirement logic 250 receives the completion status of the executed instructions from the execution units 160. The retirement logic 250 may also report branch history information to the branch predictor 232 at the front end 270 of the processor 224 to impart the latest known-good branch-history information.

As used herein, the term "instruction information" is meant to refer to basic units of work that can be understood and executed by the execution engine 430. Instruction information may be stored in a cache 425. The cache 425 may be implemented as an execution instruction cache or an execution trace cache. For embodiments that utilize an execution instruction cache, "instruction information" includes instructions that have been fetched from an instruction cache and decoded. For a CISC embodiment that decodes instructions into micro-ops, "instruction information" includes decoded micro-ops. For embodiments that utilize a trace cache, the term "instruction information" includes traces of decoded micro-operations. For embodiments that utilize neither an execution instruction cache nor trace cache, "instruction information" also includes raw bytes for instructions that may be stored in an instruction cache (such as I-cache 244).

The processing system 220 includes a memory subsystem 241 that may include one or more caches 242, 244 along with the memory 222. Although not pictured as such in FIG. 2, one skilled in the art will realize that all or part of one or both of caches 242, 244 may be physically implemented as on-die caches local to the processor 224. The memory subsystem 241 may be implemented as a memory hierarchy and may also include an interconnect (such as a bus) and related control logic in order to facilitate the transfer of information from memory 222 to the hierarchy levels. One skilled in the art will recognize that various configurations for a memory hierarchy may be employed, including non-inclusive hierarchy configurations.

Figure 3:
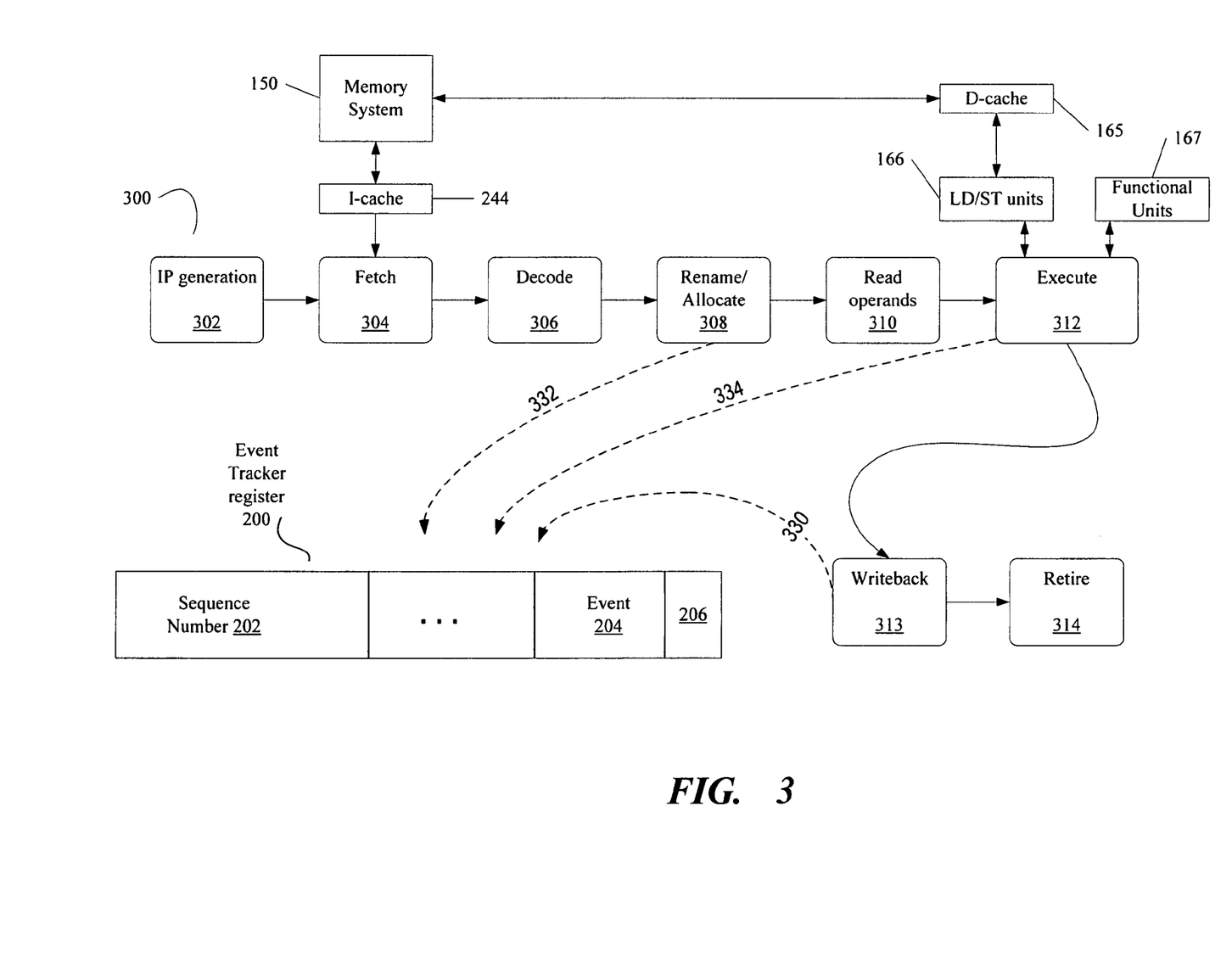
FIG. 3 is a block data flow diagram illustrating the modification of an event tracking register, to track the oldest event information in a processor, during pipeline stages in an out-of-order processor.

FIG. 3 is a block diagram illustrating further details for at least one embodiment of the event tracker register 200. FIG. 3 illustrates at least three fields 202, 204, 206 that may be written with data by the processor in order to track events for an instruction. (Again, the term "instruction" as used herein is intended to encompass the concept of a micro-op as well). FIG. 3 indicates, via ellipses, that additional fields may be included in the event tracker register 200 in order to track additional information for the oldest instruction. However, such additional fields are optional for the embodiment 200 illustrated in FIG. 3. Collectively, the data written to the fields 202, 204, 206 of the event tracker register 200 effectively provide an event status for an instruction, and the collective data may be referred to herein as "event information."

It should be understood that the particular fields of the event tracker register 200 that are discussed immediately below are illustrative of just one of many possible embodiments of the event tracker register. For all embodiments, the event tracker register 200 is at least to include a field for a value that indicates the event type for the oldest outstanding exception event or sticky event in the machine, and a field to hold an identifier value to indicate which instruction has generated the event.

Specifically regarding the embodiment 200 illustrated in FIG. 3, the event tracker register 200 may include a field 204 for an event value. The event value that is placed into the event field 204 is to indicate what type of event has been incurred during execution of an instruction, I. The event may be a fault, trap, or any other type exception. For example, the event may be any of the following (which is not by any means intended to be an exhaustive list): error correcting code (ECC) faults, page faults, code segment faults, page access fault, data segment fault, and so forth. Or, the event may be a sticky event, such as a sticky numerical exception or the enabling of breakpoint processing. For at least one embodiment, the event value placed into the event field 204 itself indicates whether the event is an exception event or a sticky event. For at least one other embodiment, however, the fields of the event tracker register 200 may include an additional field (not shown) to hold a value that indicates whether the recorded event is a sticky event.

FIG. 3 illustrates that the event tracker register 200 may also include a validity field 206. The validity field 206 is to hold a value, referred to herein as a valid bit. The valid bit may, in practice, be more than one bit. For at least one embodiment, though, the valid field 206 is a one-bit field to hold a one-bit data value. A logic-low value, for example, in the valid field 206 may indicate that the other fields of the event tracker register 200 do not necessarily include valid data. In contrast, a logic-high value, for example, in the valid field 206 may indicate that the other fields of the event tracker register 200 hold valid data.

FIG. 3 illustrates that the event tracker register 200 may also include a field 202 for a sequence number value. The sequence number value is an identifier that uniquely identifies the exception-generating instruction, I, from all other in-flight instructions in the machine. For at least one embodiment, the sequencer number is an index into the ROB, (see, e.g., 264 of FIG. 2) such that the index uniquely represents the ROB entry associated with the in-flight instruction.

The sequence number may be assigned to the instruction during a particular pipeline stage. To illustrate such pipeline stage, at least one embodiment of a typical instruction-processing pipeline 300 for an out-of-order machine is set forth in FIG. 3.

The illustrative instruction processing pipeline 300 illustrated in FIG. 3 includes the following stages: instruction pointer generation 302, instruction fetch 304, instruction decode 306, register rename and allocation 308, operand read 310, execution 312, writeback 313, and instruction retirement 314. The pipeline 300 illustrated in FIG. 3 is illustrative only. For example, stages of a different embodiment of the pipeline 300 may appear in different order than that depicted in FIG. 3.

Also, for example, alternative embodiments of the pipeline 300 may include different or additional stages than those illustrated in FIG. 3. For example, the pipeline 300 for a CISC-type (complex instruction set computing) processor may include a decode stage 306 that breaks down CISC instructions into micro-operations. In contrast, such decode stage 306 may not appear in the pipeline for a RISC-type (reduced instruction set computing) processor. Similarly, alternative embodiments of the pipeline 300 may include additional pipeline stages for rotation, expansion, exception detection, etc. In addition, a VLIW-type (very long instruction word) processor may include different pipeline stages, such as a word-line decode stage, than appear in the pipeline for a processor that includes variable-length instructions in its instruction set. Also, pipeline stages illustrated in FIG. 3, such as decode/allocate 308, may be separated into two or more separate stages (e.g., separate decode and allocate stages) for an alternative embodiment of a pipeline 300.

The pipeline 300 is now discussed with reference to FIGS. 1 and 2. The front end of the pipeline is responsible for delivering instructions to the later pipe stages. As is shown in FIG. 3, the instructions usually come from an instruction cache 160 (see discussion of FIG. 2 cache 225, above). The front end of the pipeline 300 includes the fetch phase 304 and the decode phase 306. These phases may be performed by fetch decode unit 122. After the instructions are fetched and decoded (note that instructions fetched from a trace cache or microcode ROM may not need to be decoded), they may be forwarded from the front end (see, e.g., 120 of FIG. 1 and 270 of FIG. 2), to an out-of-order execution engine (e.g., 130 of FIG. 1 and 230 of FIG. 2) in the pipeline flow.

The execution engine stages of the pipeline 300 include rename/allocate stage 308, read operands stage 310, and execute stage 312. The sequence number value associated with a particular instruction, I, may be assigned during an allocate phase of the pipeline 300. For the particular embodiment of the pipeline 300 illustrated in FIG. 3, the allocate phase and the rename phase are both combined into stage 308. However, for other embodiments the allocate phase may be a stand-alone phase.

The out-of-order execution engine (e.g., 130 of FIG. 1 and 230 of FIG. 2) has several buffers to perform its re-ordering, tracing, and sequencing operations. During the allocate phase 308, an entry in the reorder buffer (e.g., ROB 264 of FIG. 2) is allocated for each instruction. At this stage 308, the sequence number may be assigned to the instruction. As is indicated above, the sequence number allocated to the instruction at the allocate phase 308 may be the index of the ROB entry allocated to the instruction. In this manner, a sequence number may be assigned to each instruction during the allocate stage 308 of the pipeline 300.

After the allocate/rename stage 308, instructions are executed during the read operands 310 and execute 312 stages.

After the read operands stage 310 and execute stage 312 of the out-of-order execution engine, the instructions write their results back to the register file at writeback stage 313. After the instruction results have been written to the register file, the instruction completion information is written to the instructions' respective allocated entries of the ROB. The ROB decouples the execution stage 312 of the pipeline 300 from the retirement logic stage. That is, during retirement stage 314 the retire engine 208 sequences through the ROB entries in order to retire instructions in program order.

FIG. 3 illustrates that modification of the event tracker register 200 may occur during any of several stages (e.g., 308, 312, 313) of an execution pipeline 300. For example, modifications 330 to the event tracker register 200 may be performed during the writeback pipeline stage 313 for an instruction I. If an event has been detected during execution of the instruction, such event is posted to the event tracker register 200 during the pipeline stage 313 where the results of the instruction are written to the register file. (At such time that the event tracker register 200 is updated with such event information, the valid bit in the validity field 206 is set to indicate that the register 200 now includes valid data). As is discussed in further detail below in connection with FIG. 6, when such instruction I becomes the oldest instruction in the machine, and before the instruction is retired, the event tracker register 200 is queried to determine whether the register 200 contains a valid entry that indicates that an event has been posted for instruction I. If so, the event is taken, which often involves flushing younger instructions from the pipeline.

Although the preceding discussion focuses on the recording, in the event tracker register 200, of events that are detected during execution stages of the pipeline, it should be understood that modifications to the event tracker register 200 may also be performed 332 during the allocate stage, 308, for events that are detected at earlier pipeline stages.

For example, some events may be detected at the front end of the pipeline. One such event may be, for example, a code segment violation. That is, if the processor attempts to fetch, during the fetch stage 304, an instruction, and the instruction is not present in the I-cache 244, then the instruction must be fetched from the memory system 150. If the processor tries to cross the current code segment boundary to fetch the instruction, then a fault is detected in the front end (see, e.g., 120 of FIG. 1 and 270 of FIG. 2), during the fetch stage 304. For such situations, an extra one or more bits may be carried with the instruction through the pipeline, from the fetch stage 304 to the allocate stage 308. At the time of the allocate stage 308, when a sequence number is assigned to the instruction, then the event may be recorded in the event tracker register 200. That is, the event information is carried with the instruction until a sequence number is assigned at the allocate stage 308; once the sequence number is assigned, the event, including the sequence number, is recorded 332 to the event tracker register 200 at the allocate stage 308. Thus, if the event for an instruction occurs in a pipeline stage at which point a sequence number has not yet been assigned to the instruction, then one or more bits indicating the event are carried with the instruction through the pipeline 300 until a sequence number is assigned.

For at least one alternative embodiment, the event tracker register 200 may be modified 334 during the execute pipeline stage 312 rather than the writeback stage 313, for at least some instructions. For example, an execution unit that detects a fault during execution of an instruction may modify 334 the event tracker register 200 to indicate the event, rather than allowing such event to be recorded at the writeback stage 313. This modification 334 may be performed by an arithmetic logic unit (ALU) execution unit 160 (FIG. 1, FIG. 2) that detects an exception event during execution of a non-load instruction, or by a memory execution unit 160 (FIG. 1, FIG. 2) that detects an exception event during execution of a memory instruction (e.g., page fault, page access fault, data segment fault), or both.

Figure 4:
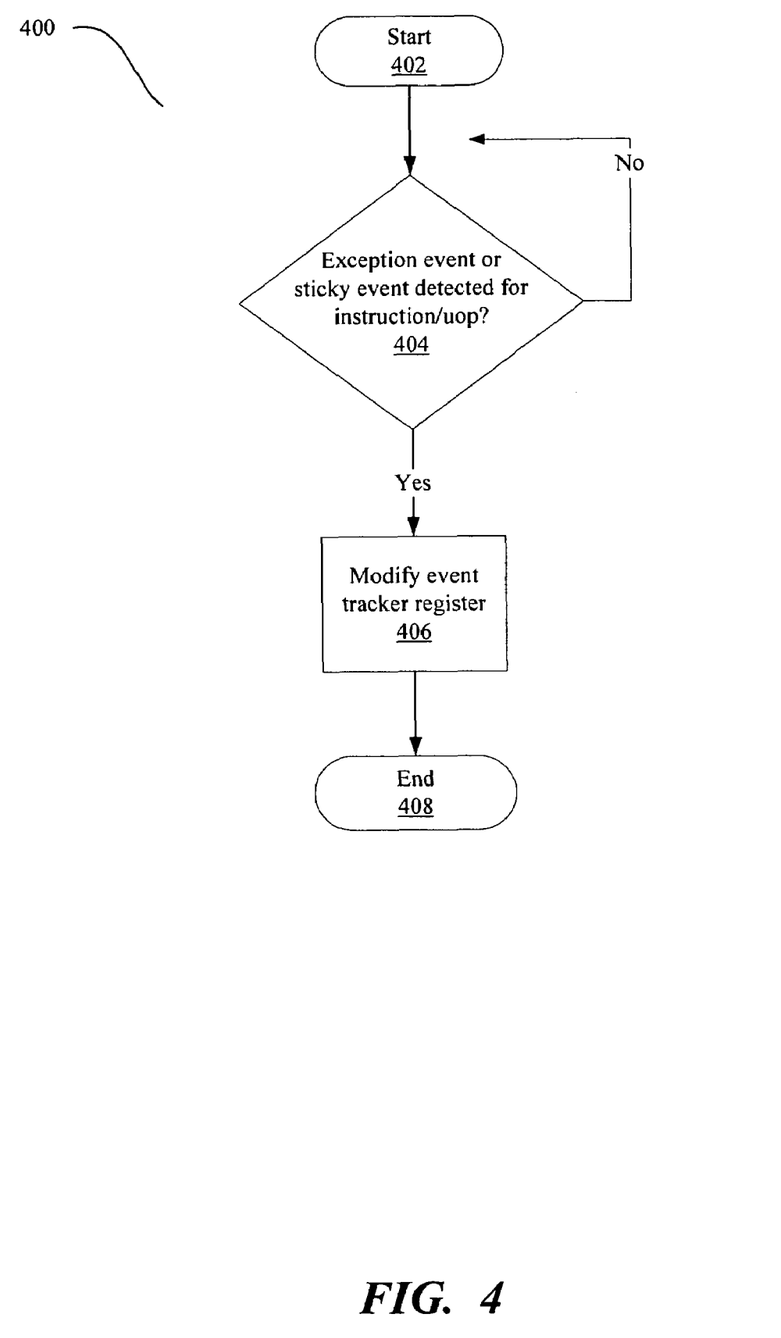
FIG. 4 is a flowchart illustrating at least one embodiment of a method for tracking event information in an event tracker register.

FIG. 4 is a flowchart illustrating a method 400 for tracking the oldest unretired exception event in a processor. The processing of the method 400 is described herein with reference to the illustration of the event tracker register 200 embodiment set forth in FIG. 3. For the method 400 illustrated in FIG. 4, it is assumed that upon power-up or reset (prior to execution of the method 400), the value in the validity field 206 has been initialized to a value indicating that the data in the register 200 is invalid. Accordingly, for purposes of discussion, it is assumed that, prior to execution of the first iteration of the method 400, a logic-low reset value (e.g., binary value of "0") has been loaded into the validity field 206 indicates that the fault register 200 has not yet been populated with valid data. Similarly, it is assumed that the other fields (e.g., the sequence number field 202 and event number field 204) have been initialized with null or invalid values. Alternatively, such fields 202, 204 are not initialized at the time that the validity field 206 is initialized. For such embodiments, the contents of the other fields 202, 204 are in an unknown state when the validity field is in a rest state.

As is discussed above, the method 400 may be performed by a processor during any of several stages of a pipeline, including an allocate stage (see, e.g., modification 332 during stage 308 of FIG. 3), an execute stage (see, e.g., modification 334 during stage 312 of FIG. 3), or a writeback stage (see, e.g., modification 330 during stage 313 of FIG. 3). For such embodiments, the method 400, as well as method 406 illustrated in FIG. 5, may be implemented as logic in the form of a hardware circuit in the execution engine (see, e.g., execution engine 130 of FIG. 1; 230 of FIG. 2).

FIG. 4 illustrates that the method 400 begins at block 402 and proceeds to block 404. At block 404, an exception event or sticky event that has occurred during execution of the instruction is detected. Again, it should be noted that the term "instruction" as used in connection with FIG. 4 is intended to denote any unit of work that can be understood and performed by an execution unit, including a micro-operation. If no exception has been detected for the instruction, then the rest of the processing of the method 400 is skipped, and processing loops back to block 404 in order to assess the next pipeline instruction.

If an exception event or sticky event is detected at block 404, then processing proceeds to block 406. At block 406, the event tracker register 200 may be modified to reflect the exception event or sticky event that has been detected during execution of the current instruction. However, as is discussed below in connection with FIG. 5, certain constraints may be observed during modification 406 in order to ensure that the event tracker register 200 maintains the event information for the oldest excepting or sticky event instruction that is in flight. From block 406, processing for the method 400 ends at block 408.

Figure 5:
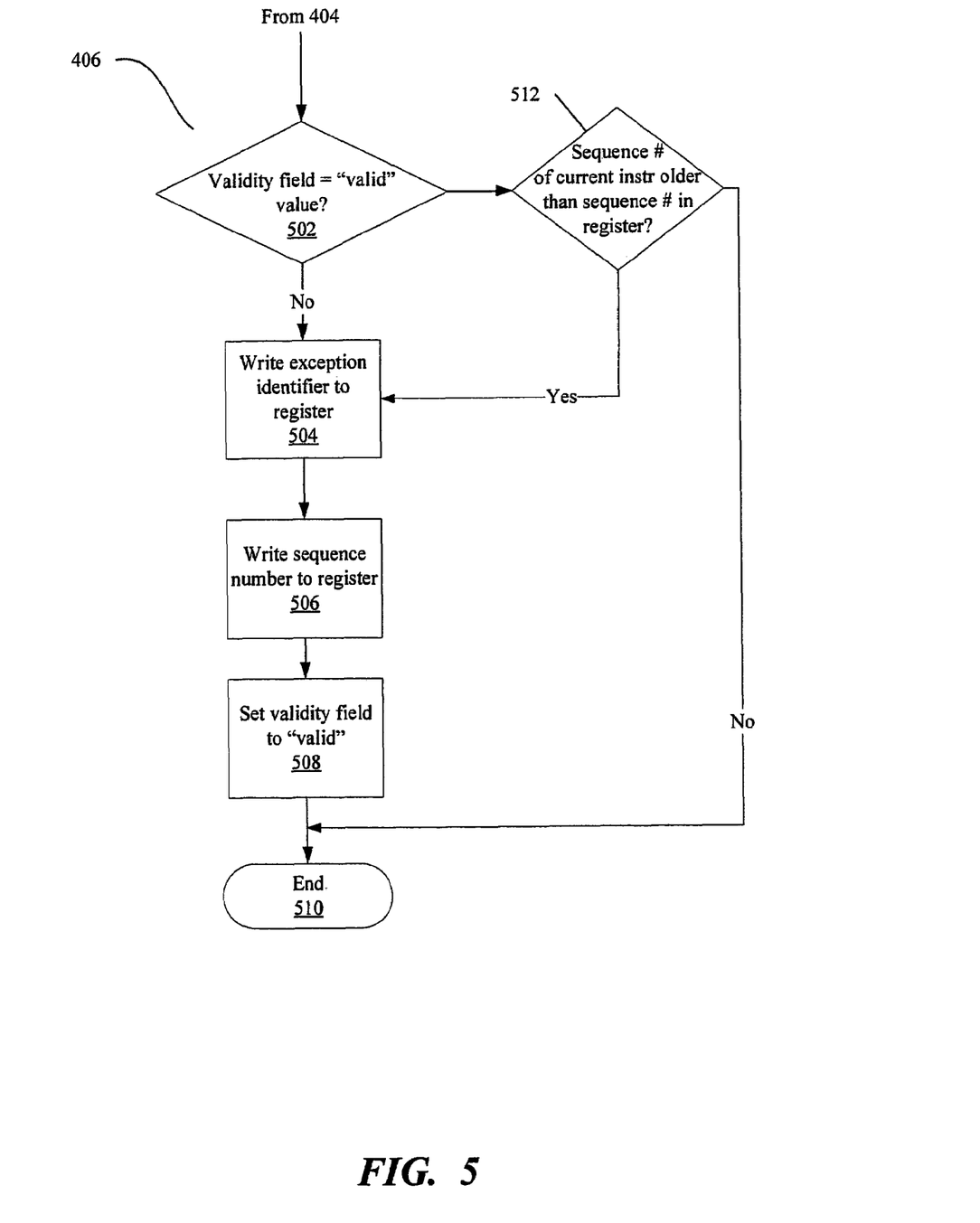
FIG. 5 is a flowchart illustrating at least one embodiment of a method for modifying an event tracker register to track the oldest event information among unretired instructions of a processor.

FIG. 5 illustrates is a flowchart that additional detail for at least one embodiment of the processing for modification 406 of the event tracker register that is illustrated in FIG. 4. FIG. 5 is discussed herein with reference to FIG. 3.

FIG. 5 illustrates that the processing for block 406 begins at block 502. At block 502, it is determined whether the event tracker register 200 currently hold valid data. For at least one embodiment, this determination 502 is made based on the value in the validity field 206 of the event tracker register 200. If the validity value indicates that the register 200 holds valid data, then processing proceeds to block 512 in order to determine whether the existing contents of the register 200 should be overwritten with event information pertaining to the current instruction. The processing of block 512 is discussed in further detail below.

If it is determined at block 502 that the register 200 does not currently hold valid data, then there is no concern about overwriting valid data, and processing proceeds to block 504, where event information regarding the current instruction is written to the register 200. Specifically, at block 504 the exception identifier is written to the event information field 204 in order to identify the type of exception event or sticky event that was triggered by the current instruction.

From block 504, processing proceeds to block 506, where an identifier ("the sequence number") for the current instruction is written to the sequence number field 202. From block 506, processing proceeds to block 508, where the validity field 206 is written to indicate a "valid" value. Processing then ends at block 510.

For at least one embodiment, the modification of the event tracker register 200 that takes place at blocks 504, 506 and 508 of FIG. 5 corresponds to the modification 330 of the event tracker register 200 shown in FIG. 3. Similarly, each of the other modifications 332, 334 shown in FIG. 3 also correspond to blocks 504, 506 and 508 of FIG. 5.

If it is determined at block 504 that the validity field 206 of the event tracker register 200 currently holds a "valid" value, then there is already an existing entry in the register 200. In such case, the existing data in the event tracker register 200 should only be overwritten to record the event information for the current instruction if the current instruction is older, according to original program order, than the instruction for which event information is currently recorded in the register 200.

Accordingly, if the evaluation at block 504 evaluates to "true", processing proceeds to block 512. At block 512, the sequence number value that is currently in the sequence number field 202 of the event tracker register 200 is compared with the sequence number for the current instruction that has triggered the exception event or sticky event. If the current instruction is older than the instruction for which event information is already recorded in the register 200, then it is appropriate to overwrite the existing contents of the register. Thus, if the evaluation at block 512 evaluates to "true", processing proceeds to block 504, and continues as described above.

If, however, the evaluation at block 512 evaluates to "false", then the current instruction is not older than the instruction whose event information is already recorded in the event tracker register 200. In such case, the register 200 should not be overwritten. Accordingly, if the evaluation at block 512 evaluates to "false", then processing ends at block 510.

Thus, FIGS. 4 and 5 illustrate at least one embodiment of a method 400 for modifying the values in the event tracker register 200 in order to track the oldest exception event or sticky event in a processor.

Figure 6:
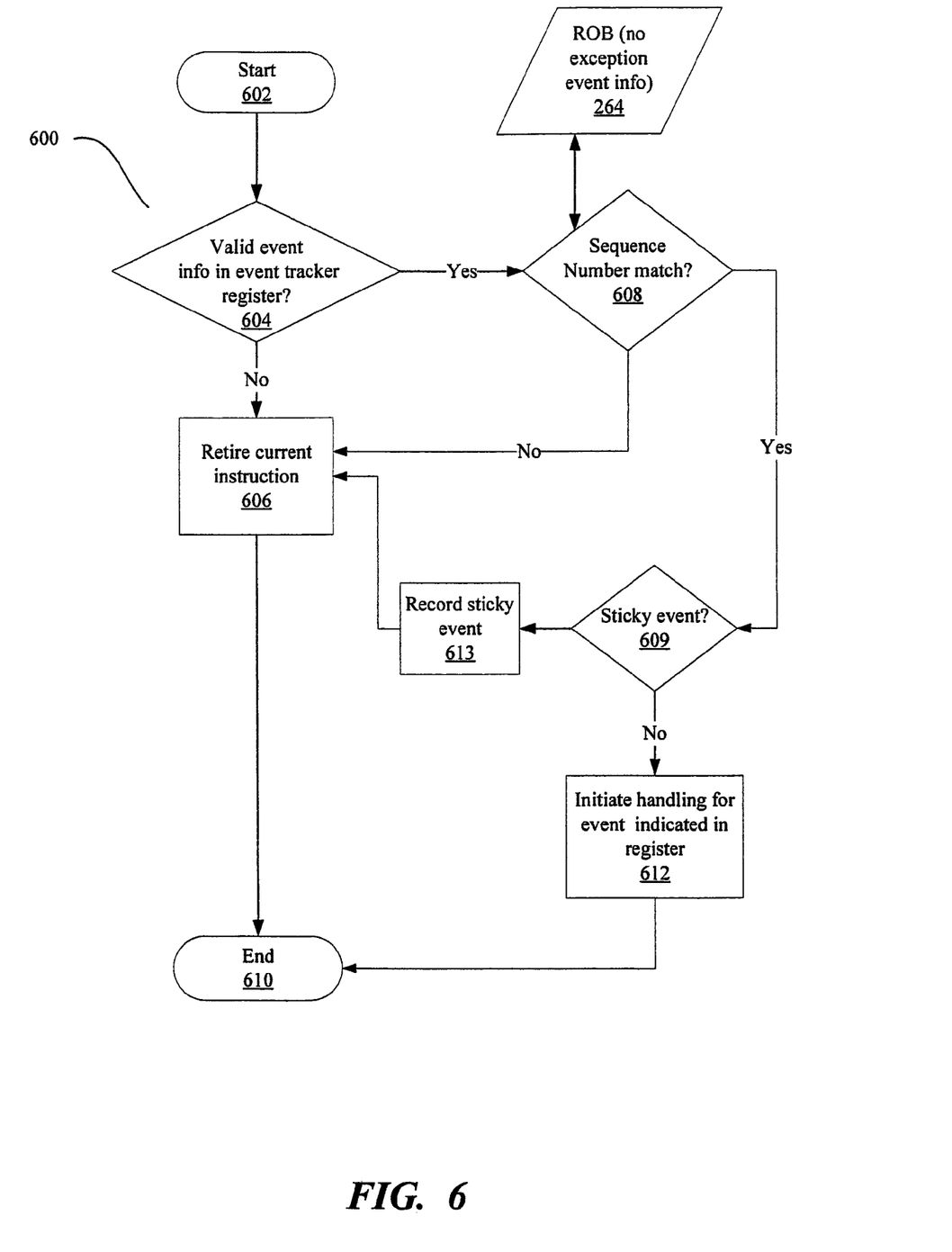
FIG. 6 is a flowchart illustrating at least one embodiment of a method for utilizing an event tracker register to detect event information during retirement processing.

Turning to FIG. 6, shown is a flow chart for at least one embodiment of a method 600 for utilizing the contents of the event tracker register 200 in order to initiate exception processing in a processor. FIG. 6 is discussed herein with reference to FIG. 3. For at least one embodiment, the method 600 is performed during a retirement stage of a pipeline (see, e.g., retirement stage 314 of pipeline 300 in FIG. 3). For such embodiment, the method 600 may be performed by a hardware logic circuit in the retire engine (see, e.g., retire engine 250 of FIG. 2).

For the embodiment of the method 600 shown in FIG. 6, a queue such as a reorder buffer ("ROB")is maintained in order to maintain not-yet-retired instructions in program order for retirement. For such embodiment, the event information for an instruction, such as the exception identifier that identifies the type of exception or sticky event that has been triggered by execution of the instruction, is not maintained in the ROB. Instead, such event information is tracked only in the event tracker register 200 and not in the ROB. The ROB entries are, instead, populated with other information relevant to the instruction.

FIG. 6 illustrates that the method 600 begins at block 602 and proceeds to block 604. At block 604, a current instruction is a candidate for retirement. The candidate may have been identified, for example, by traversing to the next entry of the ROB. The processing of block 604 checks the value in the validity field 206 of the event tracker register 200 to determine whether event information is currently recorded for any in-flight instruction. If the field 206 does hold a "valid" value, then there is event information recorded, and processing proceeds from block 604 to block 608.

If the field 206 does not hold a "valid" value, then no event information is currently recorded for any in-flight instruction, and the current instruction may be retired as normal. Thus, if the determination at block 604 evaluates to "false", processing proceeds from block 604 to block 606. At block 606, the current instruction is retired. Processing then ends at block 610.

If it is determined at block 604 that the event tracker register 200 currently contains a valid entry, then processing proceeds to block 608. From here, processing is performed in order to determine whether the event information recorded in the event tracker register 200 pertains to the current instruction that is a candidate for retirement. Accordingly, at block 608 the sequence number value in the sequence number field 202 of the register 200 is compared with the sequence number of the current instruction that is a candidate for retirement. If there is no match, then the candidate instruction may be retired normally. Thus, if the determination at block 608 evaluates to "false," processing proceeds to block 606, and retirement processing proceeds as discussed above.

However, if a match in sequence numbers is detected at block 608, then the current candidate instruction has caused an exception that should be taken, or has caused a sticky event that should be recorded in the machine. That is, the instruction whose event information is stored in the register 200 is currently up for retirement. Accordingly, if the sequence number comparison at block 608 evaluates to "true", then processing proceeds from block 608 to block 609. At block 609, it is determined whether the event information recorded in the event tracker register 200 pertains to a sticky event. If so, then processing proceeds to block 613. At block 613, the sticky event is recorded in an indicator in the processor. For at least one embodiment, the event may be recorded at block 613 in an architectural register, such as a status flag bit in a status register. For the embodiment illustrated in FIG. 6, it is assumed that retirement of the instruction that caused the sticky event should proceed as normal. Thus, FIG. 6 illustrates that processing proceeds from block 613 to block 606, where the instruction whose execution caused the sticky event is retired normally. However, for an alternative embodiment, it may be the case that exception processing is required for at least some sticky events. For such embodiment, processing proceeds from block 613 to block 612 for such sticky events, rather than proceeds from block 613 to block 606.

If it is determined at block 609 that the event information recorded in the register 200 pertains to an exception rather than to a sticky event, then processing proceeds to block 612. At block 612, rather than retiring the instruction, the exception is handled as appropriate, based upon the event information recorded in the event field 204 of the register. Such handling typically entails initiating a processing sequence that invokes the appropriate exception handler code, which may result in flushing the pipeline of younger instructions. Accordingly, at block 612 the method 600 may initiate an exception handling sequence for the indicated exception.

Figure 7:
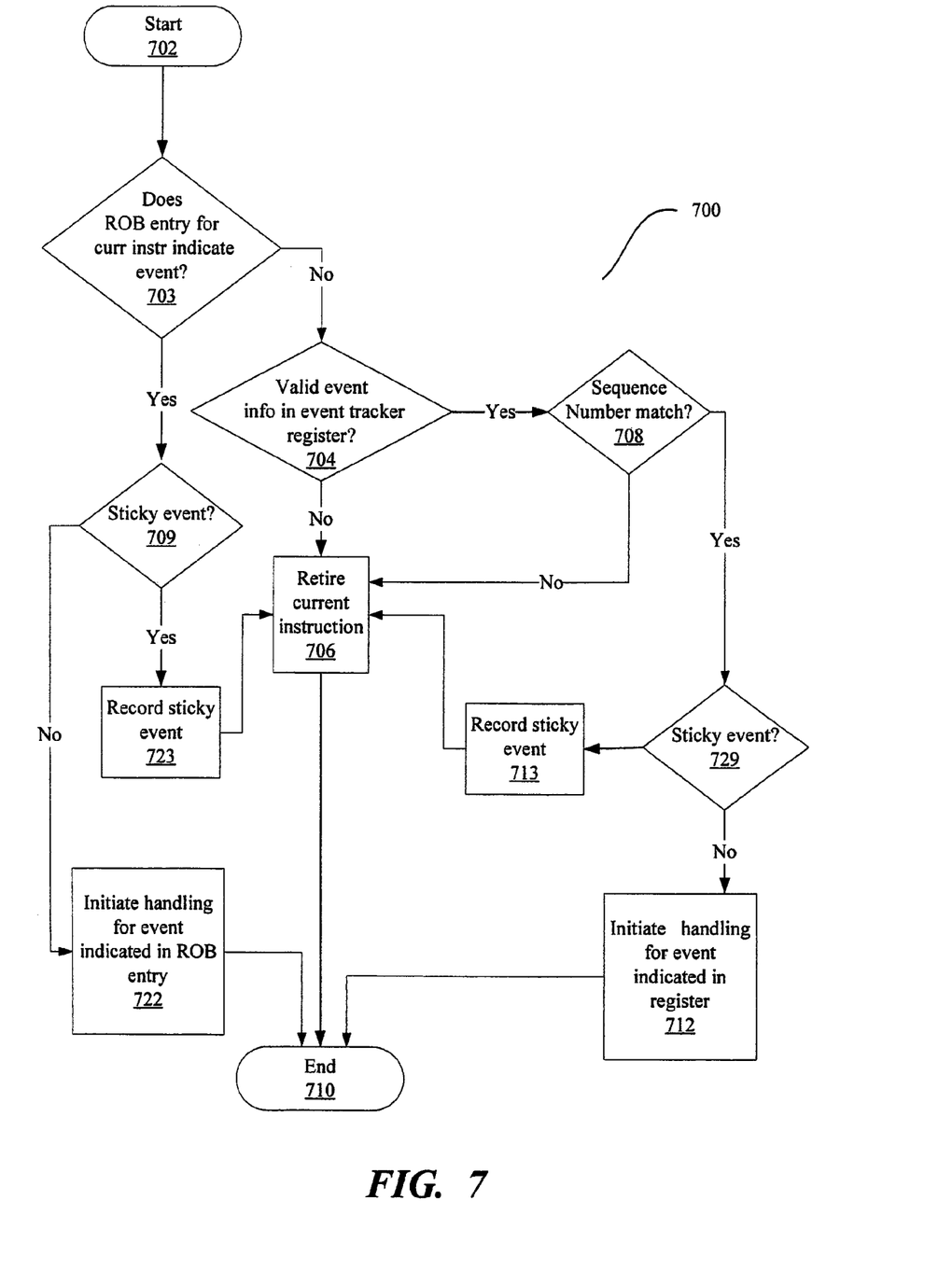
FIG. 7 is a flowchart illustrating at least one other embodiment of a method for utilizing an event tracker register to detect event information during retirement processing.

FIG. 7 is a flowchart for at least one embodiment of a method 700 for utilizing the event tracker register 200 in conjunction with event information that is maintained on a per-instruction basis in the entries of a ROB (see, e.g., ROB 264 of FIG. 2). Such hybrid approach may be utilized, for example, for embodiments that track most exception information in the ROB entries, but that utilize the event tracker register 200 to additionally track exception information.

Such hybrid approach may be useful, for example, to capture late-arriving faults, such as, e.g., ECC and load floating point faults, which may not be captured early enough in the pipeline to be recorded in the ROB entries. If the event information is calculated late and cannot be written to the ROB in time, the event information may be placed into the event tracker register according the methods 400, 406 illustrated in FIGS. 4 and 5. FIG. 7 is discussed herein with reference to FIG. 3.

For at least one embodiment, the method 700 is performed during instruction retirement. For such embodiment, the method 700 may be performed by a hardware logic circuit in the retire engine (see, e.g., retire engine 250 of FIG. 2).

FIG. 7 illustrates a method 700 for determining at retirement time whether an instruction has generated an exception or sticky event, where the event information may be in either the ROB entry for the instruction or in an event tracker register 200. The method 700 may begin at block 702 and may proceed to block 703. At block 703 the ROB entry for the current instruction, which is a candidate for retirement, is evaluated to determine whether any exception event or sticky event has been recorded in the ROB entry during an earlier pipeline stage for the current instruction. If not, then processing proceeds to block 704. Blocks 704, 708, 729, 712, 713, 706, and 710 are performed along the lines of the processing of blocks 604, 608, 609, 612, 613, 606, and 610, respectively, as discussed above in connection with FIG. 6. Processing ends at block 710.

However, if the evaluation at bock 703 evaluates to "true", then event information has been recorded in the ROB for the current retirement candidate. In such case, processing proceeds from block 703 to block 709. At block 709, it is determined whether the event information recorded in the event tracker register 200 pertains to a sticky event. If so, then processing proceeds to block 723. At block 723, the sticky event is recorded in an indicator in the processor. For at least one embodiment, the event may be recorded at block 723 in an architectural register, such as a status flag bit in a status register. For the embodiment illustrated in FIG. 7, it is assumed that retirement of the instruction that caused the sticky event should proceed as normal. Thus, FIG. 7 illustrates that processing proceeds from block 723 to block 706, where the instruction whose execution caused the sticky event is retired normally. However, for an alternative embodiment, it may be the case that exception processing is required for at least some sticky events. For such embodiment, processing proceeds from block 723 to block 722 for such sticky events, rather than proceeding from block 723 to block 706.

If it is determined at block 709 that the event information recorded in the register 200 pertains to an exception rather than to a sticky event, then processing proceeds to block 722, and such exception is processed at block 713 in a known manner. Processing then ends at block 710.

One of skill in the art will recognize that the evaluations at blocks 703 and 704 need not necessarily be performed in the order shown. The order of operations shown in FIG. 7 is for illustrative purposes only and should not be taken to be limiting. For example, for other embodiments block 704 is performed before block 703. For yet other embodiments, the evaluations at blocks 703 and 704 may be performed simultaneously.

The foregoing discussion describes selected embodiments of methods, systems and apparatuses to track, in a single-entry register rather than in one of a plurality of queue entries, exception event information for the oldest excepting in-flight instruction for an out-of-order processor. In the preceding description, various aspects of methods, system and apparatuses have been described. For purposes of explanation, specific numbers, examples, systems and configurations were set forth in order to provide a more thorough understanding. However, it is apparent to one skilled in the art that the described method and apparatus may be practiced without the specific details. In other instances, well-known features were omitted or simplified in order not to obscure the method and apparatus.

Embodiments of the method may be implemented in hardware, hardware emulation software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

At least one embodiment of an example of such a processing system is shown in FIG. 2. Sample system 220 may be used, for example, to execute the processing for a method of tracking an oldest exception event in a single register. Sample system 220 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, engineering workstations, personal digital assistants and other hand-held devices, set-top boxes and the like) may also be used. For one embodiment, sample system may execute a version of the Windows™ operating system available from Microsoft Corporation, although other operating systems and graphical user interfaces, for example, may also be used.

Referring to FIG. 2, sample processing system 220 includes a memory system 222 and a processor 224. Memory system 222 may store instructions 210 and data 212 for controlling the operation of the processor 224.

Memory system 222 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 222 may store instructions 210 and/or data 212 represented by data signals that may be executed by processor 224.

Figure 8:
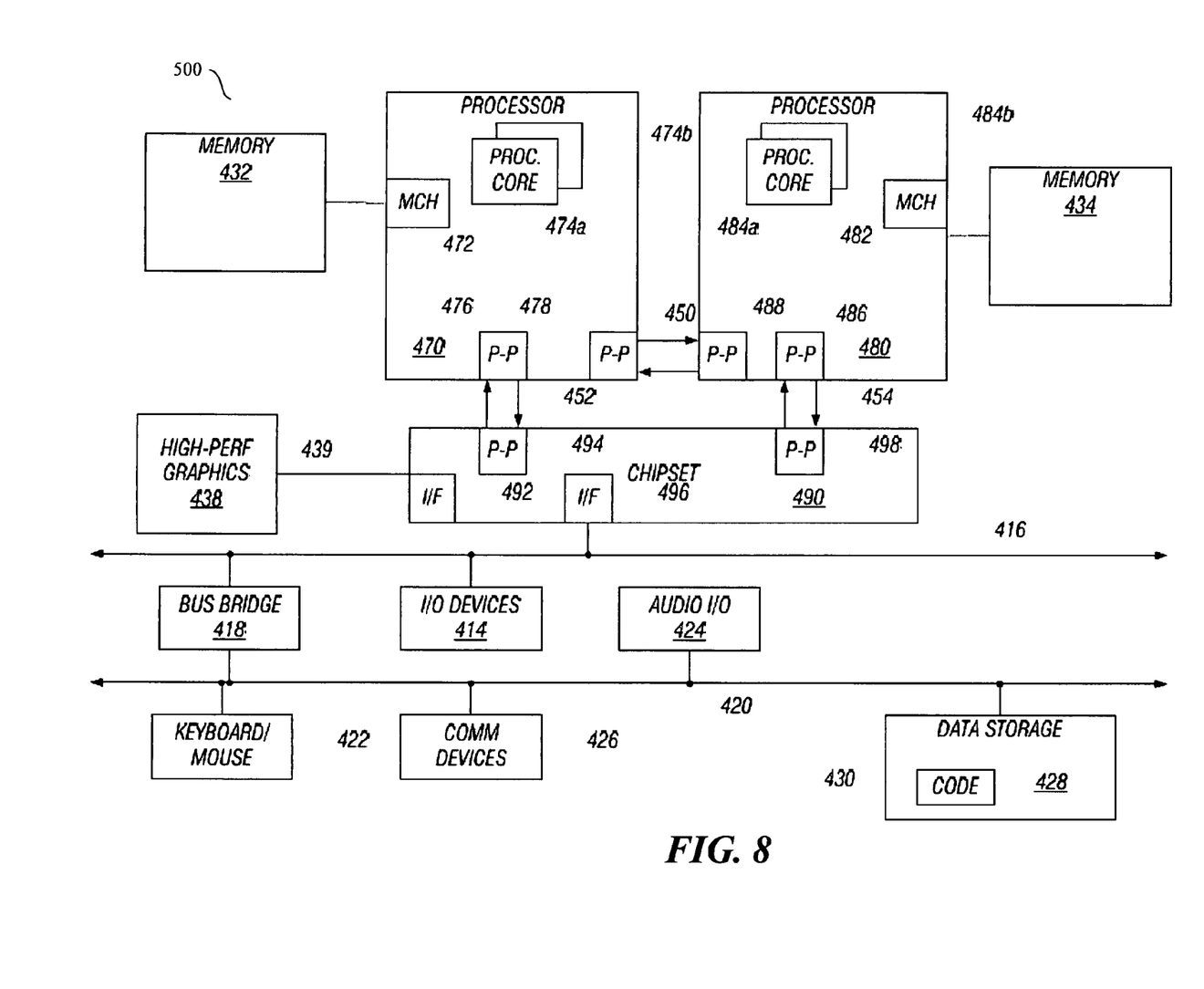
FIG. 8 is a block diagram illustrating at least one embodiment of a second processor capable of performing disclosed techniques.

Embodiments of the claimed invention may be implemented in many different system types. Referring now to FIG. 8, shown is a block diagram of a multiprocessor system in accordance with an embodiment of the present invention. As shown in FIG. 8, the multiprocessor system is a point-to-point interconnect system, and includes a first processor 470 and a second processor 480 coupled via a point-to-point interconnect 450. As shown in FIG. 8, each of processors 470 and 480 may be multicore processors, including first and second processor cores (i.e., processor cores 474a and 474b and processor cores 484a and 484b). While not shown for ease of illustration, first processor 470 and second processor 480 (and more specifically the cores therein) may include an event tracker register in accordance with an embodiment of the present invention (see, e.g., 200 of FIG. 3).

Rather having a north bridge and south bridge, the system 400 shown in FIG. 8 may instead have a hub architecture. The hub architecture may include an integrated memory controller hub Memory Controller Hub (MCH) 472, 482 integrated into each processor 470, 480. A chipset 490 may provide control of Graphics and AGP.

Thus, the first processor 470 further includes a memory controller hub (MCH) 472 and point-to-point (P-P) interfaces 476 and 478. Similarly, second processor 480 includes a MCH 482 and P-P interfaces 486 and 488. As shown in FIG. 8, MCH's 472 and 482 couple the processors to respective memories, namely a memory 432 and a memory 434, which may be portions of main memory locally attached to the respective processors.

While shown in FIG. 8 as being integrated into the processors 470, 480, the memory controller hubs 472, 482 need not necessarily be so integrated. For at least one alternative embodiment, the logic of the MCH's 472 and 482 may be external to the processors 470, 480, respectively. For such embodiment one or more memory controllers, embodying the logic of the MCH's 472 and 482, may be coupled between the processors 470, 480 and the memories 432, 434, respectively. For such embodiment, for example, the memory controller(s) may be stand-alone logic, or may be incorporated into the chipset 490.

First processor 470 and second processor 480 may be coupled to the chipset 490 via P-P interconnects 452 and 454, respectively. As shown in FIG. 8, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification, Revision* 2.0, published May 4, 1998, by Intel Corporation, Santa Clara, Calif. Alternately, a point-to-point interconnect 439 may couple these components.

In turn, chipset 490 may be coupled to a first bus 416 via an interface 496. For one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation input/output (I/O) interconnect bus, although the scope of the present invention is not so limited.

As shown in FIG. 8, various I/O devices 414 may be coupled to first bus 416, along with a bus bridge 418 which couples first bus 416 to a second bus 420. For one embodiment, second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420. Note that other architectures are possible. For example, instead of the point-to-point architecture of FIG. 8, a system may implement a multi-drop bus or another such architecture.

Program code may be applied to input data to perform the functions described herein and generate output information. Accordingly, alternative embodiments of the invention also include machine-accessible media containing instructions for performing the operations of the invention or containing design data, such as HDL, that defines structures, circuits, apparatuses, processors and/or system features described herein. Such embodiments may also be referred to as program products.

Such machine-accessible media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A processor comprising:
a register to store event information for an event detected during out-of order processing of an instruction;
a queue to maintain an entry for said instruction to support in-order retirement, wherein said entry is to store said event information, wherein the register is to store the event information when the event is not captured in sufficient time to store the event information in the queue entry;
a retire engine, coupled to the register and to the queue, to compare a sequence number of the queue entry with a sequence number value in the register;
said retire engine further to initiate a handling sequence if said queue entry sequence number matches said sequence number value.

2. The processor of claim 1, further comprising:
a decode unit to decode a macroinstruction into two or more micro-operations;
wherein said instruction is a micro-operation.

3. The processor of claim 1, further comprising:
an execution engine to write the event information to said register during an out-of order processing pipeline stage prior to processing of said instruction by said retire engine.

4. The processor of claim 3, wherein:
said execution engine is further to write the event information to said register only if said instruction is older, in program order, than a second instruction whose event information resides in said register.

5. The processor of claim 1, wherein:
said register includes a plurality of data fields, the data fields comprising at least a validity field, a sequence number field, and an event identifier field.

6. The processor of claim 1, wherein:
said event information to be stored by said register further comprises a value to identify a fault event.

7. The processor of claim 1, wherein:
said event information to be stored by said register further comprises a value to identify a trap event.

8. The processor of claim 1, wherein said handling sequence further comprises setting an indicator to denote a sticky event.

9. The processor of claim 1, wherein said handling sequence further comprises retiring the instruction.

10. The processor of claim 1, wherein said handling sequence further comprises an exception-handling sequence.

11. The processor of claim 1, wherein:
said event information to be stored by said register further comprises a value to identify a sticky event.

12. The processor of claim 1, wherein the event information is to be written to the register during a rename stage of a pipeline.

13. The processor of claim 1, wherein when a fault occurs with regard to the instruction in a front end stage of a pipeline, the instruction is to carry at least one bit to indicate the fault to enable an allocate stage that is to assign the queue entry sequence number to record the sequence number value in the register corresponding to the queue entry sequence number.

14. A system comprising:
a memory system coupled to a processor;
the processor having a register to store event information for an oldest excepting unretired instruction;
the processor having a queue having a plurality of reorder entries, each of the reorder entries to store information associated with one of a plurality of instructions for in-order retirement and event information for the instruction, wherein the register is to store event information regarding a fault that is captured too late to be stored in the corresponding reorder entry of the queue;
the processor further comprising out-of-order processing logic to process the instruction and to record the event information in the register; and
the processor further comprising a retire engine to initiate an exception handling sequence, based on the event information stored in the register and the event information stored in the corresponding reorder entry of the queue, during in-order retirement processing for the instruction, wherein said retire engine is to evaluate both the contents of the register and the contents of a reorder entry for the instruction to determine whether to initiate exception handling instead of retirement of the instruction.

15. The system of claim 14, wherein:
the out-of order processing logic is further to record event information for a first instruction in the register only if the first instruction is older, in program order, than a second instruction whose event information resides in the register.

16. The system of claim 14, wherein:
said register is to further store a value to identify a fault event.

17. The system of claim 14, wherein:
said register is to further store a value to identify a trap event.

18. The system of claim 14, wherein:
said register is to further store a value to identify a sticky event.

19. A method, comprising:
detecting an exception event during out-of order processing for a first instruction;
populating an entry of a reorder buffer with data to record a type of the exception event when the exception event is captured in sufficient time to be populated in the reorder buffer entry, along with other information regarding the first instruction, where the other information does not include the event type data;
modifying an event tracker register with data to record the type of the exception event when the exception event is not captured in sufficient time to be populated in the reorder buffer entry;
traversing the reorder buffer to identify a retirement candidate instruction; and
initiating an exception handler sequence responsive to the recorded type data in the event tracker register indicating that the retirement candidate instruction requires exception handling.

20. The method of claim 19, wherein said modifying further comprises:
overwriting the current contents of the event tracker register responsive to determining that the event tracker register contents are not valid.

21. The method of claim 19, wherein said modifying further comprises:

overwriting the current contents of the event tracker register responsive to determining that the contents pertain to a younger instruction than the first instruction.

22. The method of claim 19, wherein said modifying further comprises:

modifying the event tracker register with data to record a sticky event.

23. The method of claim 19, wherein said modifying further comprises:

writing an instruction identifier value to the event tracker register.

24. The method of claim 23, wherein:

the instruction identifier value is an index, into the reorder buffer, for an entry of the reorder buffer corresponding to the first instruction.

25. The method of claim 19, wherein said modifying further comprises:

writing a valid value to a validity field of the event tracker register.

* * * * *